United States Patent [19]

Furukawa et al.

[11] Patent Number: 4,805,419
[45] Date of Patent: Feb. 21, 1989

[54] ABSORPTION TYPE HEAT EXCHANGING APPARATUS

[75] Inventors: Tetsuro Furukawa, Suita; Kensuke Yoshikawa, Katano; Mitsuru Mizuuchi, Nishinomiya; Masaharu Furutera, Gose; Nobuharu Sakabata, Osaka; Yoshiaki Matsushita, Maizuru; Tomoyoshi Muto, Kumamoto; Tatsuhiko Umeda, Nara, all of Japan

[73] Assignee: Hitachi Zosen Corporation, Japan

[21] Appl. No.: 162,499

[22] Filed: Feb. 25, 1988

[30] Foreign Application Priority Data

Mar. 19, 1987 [JP] Japan .................................. 62-66693

[51] Int. Cl.$^4$ ............................................ F25B 15/00
[52] U.S. Cl. ........................................ 62/476; 62/489
[58] Field of Search ................................. 62/476, 489

[56] References Cited

U.S. PATENT DOCUMENTS

| | | | |
|---|---|---|---|
| 3,145,542 | 8/1964 | Aronson | 62/476 X |
| 3,279,206 | 10/1966 | Leonard, Jr. | 62/489 X |
| 3,296,823 | 1/1967 | Novak et al. | 62/476 |
| 3,296,824 | 1/1967 | Rohrs et al. | 62/476 X |
| 3,392,547 | 7/1968 | Hopkins | 62/489 X |
| 3,608,332 | 9/1971 | Leonard, Jr. | 62/489 X |

Primary Examiner—Lloyd L. King
Attorney, Agent, or Firm—Barnes, Kisselle, Raisch, Choate, Whittemore & Hulbert

[57] ABSTRACT

This invention relates to an absorption type heat exchanging apparatus having an evaporation unit, an absorption unit, a condensation unit and a regeneration unit. A diluted absorption liquid transfer pipe and a concentrated absorption liquid transfer pipe are installed between the absorption and regeneration units. A pump placed in one of these pipes is connected to a power take-off device which is placed in the other pipe and which is adapted to have rotative driving power imparted thereto by the absorption liquid in the pipe. Rotative driving power is imparted to the power take-off device by the energy based on the difference between the pressures in the regeneration and absorption units. This rotative driving power is transmitted to the pump. Thereby, the power to be provided to the pump from the outside is reduced.

4 Claims, 2 Drawing Sheets

ABSORPTION TYPE HEAT EXCHANGING APPARATUS

FIELD OF THE INVENTION

The present invention relates to an absorption type heat exchanging apparatus such as an absorption type heat pump or an absorption type refrigerator.

BACKGROUND OF THE INVENTION

Absorption type heat exchanging apparatus which is now in practical use, such as absorption type heat pumps and absorption type refrigerators comprise an evaporation unit, an absorption unit, a condensation unit and a regeneration unit. The refrigerant/absorption liquid combination used in this apparatus is generally a water/LiBr or $NH_3$/water combination.

Water and $NH_3$, which are refrigerants, have high values of the latent heat of evaporation, being preferable in that the circulating amount of liquid required for the same refrigerating power is relatively small. Since the absorption liquid is circulated between the regeneration and absorption units which have pressures approximately equal to the saturation pressures respectively corresponding to the evaporation temperature and condensation temperature of the refrigerant, it is transferred to the higher pressure side after having its pressure increased by a pump, while it is transferred to the lower pressure side through a throttle valve. The power required for circulation is rather low.

Recently, freon type refrigerant (for example, "Freon 22", and "Freon" is trade name of polyhalogenated hydrocarbons containing fluorine and chlorine) has been considered to be useful because of such advantages as safety and a reduction in the size of the apparatus. However, since freon is generally low in the latent heat of evaporation, the circulating amount is greater than in the case of water or $NH_3$. Another difficulty is that if predetermined temperature difference is to be obtained, there is involved a greater difference between pressures at the evaporation and condensation temperatures than in the case of water being used. Thus, the power of the pump for transferring the absorption liquid (for example, a solution of Freon 22 in diethylene glycol dimethyl ether) from the lower pressure side to the higher pressure side increases, raising a problem that the advantage of the required power being lower than that of the compression type heat pump or refrigerator is lost.

The required theroetical pump power of the refrigerator with respect to the refrigerant/absorption liquid combinations mentioned above is shown in Table 1.

TABLE 1

| Refrigerant/ absorption liquid | Water/LiBr | $NH_3$/water | Freon 22/ DEGDME |
| --- | --- | --- | --- |
| Evaporation pressure (k Pa) | 1.0 | 550 | 590 |
| Condensation pressure (k Pa) | 7.33 | 1600 | 1570 |
| Circulating amount of solution per Rt (kg/Rt) | 71 | 117 | 974 |
| Theoretical pump power (kW/Rt) | $1 \times 10^{-4}$ | 0.046 | 0.36 |

(Note)
1 Rt: 1 refregeration ton
DEGDME: diethylene glycol dimethyl ether

The calculations in Table 1 are made on the assumption that the condensation temperature of the refrigerant is 40° C. and its evaporation temperature is 7° C. Further, it is assumed that the regeneration unit outlet temperature of the refrigerant is 90° C. and the absorption unit outlet temperature is 40° C.

It is seen from Table 1 that the freon type refrigerant requires 3600 times and 8 times as much pump power as that required by water and $NH_3$, respectively.

DISCLOSURE OF THE INVENTION

The present invention, which solves the problems described above, has for its object the provision of an absorption type heat exchanger apparatus which does not require high pump power even if a freon type refrigerant is used.

According to the invention, an absorption type heat exchanger apparatus having an evaporation unit, an absorption unit, a regeneration unit and a condensation unit comprises:

diluted absorption liquid transfer pipe means whereby a diluted liquid which has absorbed a refrigerant in the absorption unit is transferred to the regeneration unit, concentrated absorption liquid transfer pipe means whereby a concentrated absorption liquid having its refrigerant evaporated in the regeneration unit is transferred to the absorption unit, pump means placed in one of said diluted and concentrated absorption liquid transfer pipe means and having a rotary shaft, a rotatively driving means for driving the pump means, power take-off means placed in the other of said diluted and concentrated liquid transfer pipe means, having a rotary shaft and adapted to receive rotative driving power from the absorption liquid flowing through said other pipe means, wherein the rotary shaft of said power take-off means being connected to the rotary shaft of said pump means.

In the arrangement described above, in the case where the pressure in the regeneration unit is higher than that in the absorption unit, the pump means is installed in the diluted liquid transfer pipe means and the power take-off means is installed in the concentrated absorption liquid transfer pipe means. The diluted absorption liquid has its pressure increased by the pump means and is then transferred to the regeneration unit. The concentrated absorption liquid in the regeneration unit is transferred to the absorption unit by said pressure difference via the concentrated absorption liquid transfer pipe means. At this time, rotative driving power is imparted to the power take-off means by the energy based on the difference between the pressures in the regeneration and absorption units, and this rotative power is transmitted to the pump means. Thereby, the reduction of the pump power is attained, a fact which is economical.

The circulating amounts of the refrigerant/absorption liquid should always be substantially balanced; such balance can be maintained at all times by making the pump means and power take-off means the volumetric type, independently of variations in the external conditions and variations in the rotation speed of the pump means. In the case where the present heat exchanging apparatus is mounted on a vehicle or the like and the pump means is driven by an enging, the rotation speed will vary to a great extent, but the necessary discharge pressure can always be maintained and at the same time the power can be efficiently recovered regardless of the rotation speed.

The arrangement of the invention is especially effective for use in absorption heat pump using freon as a refrigerant, from the standpoint of pumping power saving, though there is almost no pumping power problem with the conventional refrigerant/absorbent solution combinations.

EMBODIMENT

Figure 1:
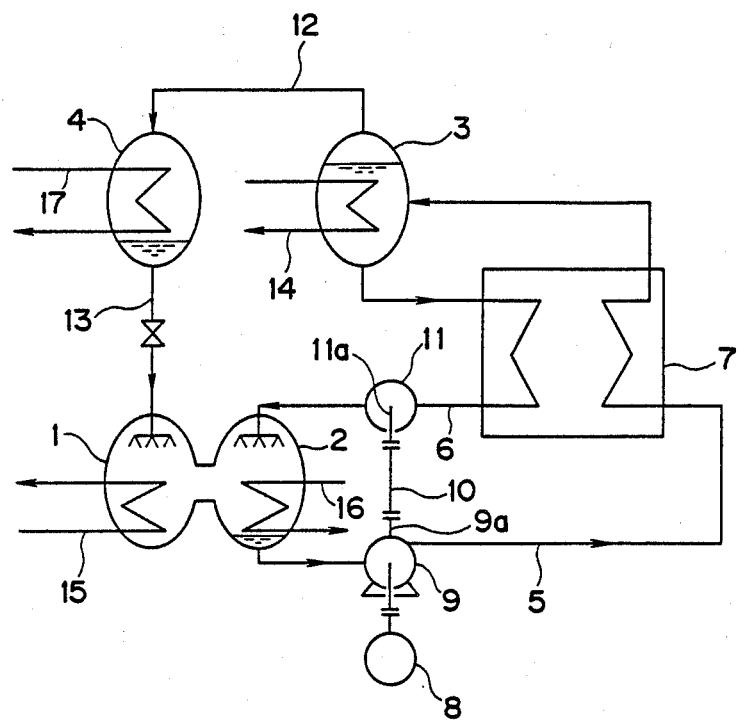
FIG. 1 is a schematic setup diagram of an embodiment of an absorption type heat exchanging apparatus of the present invention.

FIG. 1 schematically shows the setup of a first-kind absorption heat pump. The first-kind absorption heat pump is a system in which waste heat is used as a heat source in an evaporation unit which represents heat absorbing process, and in which a heat source in the form of vapor or the like whose temperature is higher than that of said waste heat is used in a regeneration unit; it is similar to the refrigeration cycle.

This absorption heat pump comprises an evaporation unit 1 for evaporating a freon type refrigerant such as Freon 22, an absorption unit 2 in which the refrigerant vapor produced by said evaporation unit 1 is absorbed in an absorption liquid (diethylene glycol dimethyl ether), a regeneration unit 3 in which the diluted absorption liquid which has been diluted by absorbing the refrigerant vapor in said absorption unit 2 is overheated to evaporate the refrigerant contained therein so as to provide a concentrated absorption liquid, a condensation unit 4 in which the refrigerant vapor produced in said regeneration unit 3 is condensed to provide a refrigerant liquid, a diluted liquid transfer pipe 5 for transferring the diluted absorption liquid in the absorption unit 2 to the regeneration unit 3, a concentrated liquid transfer pipe 6 for transferring the concentrated absorption liquid in the regeneration unit 3 to the absorption unit 2, a heat exchanger 7 interposed between said two transfer pipes 5 and 6 to effect heat recovery by imparting the heat of the condensed absorption liquid to the diluted absorption liquid, a volumetric type pump (vane pump, gear pump or the like) placed in said diluted absorption transfer pipe 5 and driven by a driving device 8 (electric motor or internal combustion engine), a volumetric type hydraulic turbine 11 placed in said condensed absorption liquid transfer pipe 6 and having a rotary shaft 11a connected to the rotary shaft 9a of said pump 9 through a connecting shaft 10, a refrigerant vapor transfer pipe 12 for transferring the refrigerant vapor from said regeneration unit 3 to the condensation unit 4, and a refrigerant liquid transfer pipe 13 for transferring the refrigerant liquid from the condensation unit 4 to the evaporation unit 1. The numerals 14 and 15 denote pipes for heating fluid disposed in the evaporation unit 1. The numerals 16 and 17 denote pipes for fluid to be heated, disposed in the absorption and condensation units 2 and 4, respectively.

The operation will now be described.

The freon vapor produced in the evaporation unit 1 is absorbed in the absorption liquid in the absorption unit 2, and the heat generated by this absorption is used to heat the fluid to be heated flowing through the pipe 16. The diluted absorption liquid which contains absorbed freon vapor is fed to the regeneration unit 3 by the pump 9 via the diluted absorption liquid transfer pipe 5. In the regeneration unit 3, the diluted absorption liquid is heated to produce freon vapor. This freon vapor is condensed in the condensation unit 4, whereupon it is fed to the evaporation unit 1, where it is evaporated again. On the other hand, the concentrated absorption liquid produced in the regeneration unit 3 is returned to the absorption unit 2 via the concentrated absorption liquid transfer pipe 6 by the difference between the pressures in the regeneration and absorption units 3 and 2, while the hydraulic turbine 11 placed in the concentrated absorption liquid transfer pipe 6 is rotated by said pressure difference, so as to auxiliarily rotate the pump 9. This means that the energy based on the difference between pressures in the regeneration and absorption units 3 and 2 is effectively recovered and utilized as the power for transferring the diluted absorption liquid.

Figure 2:
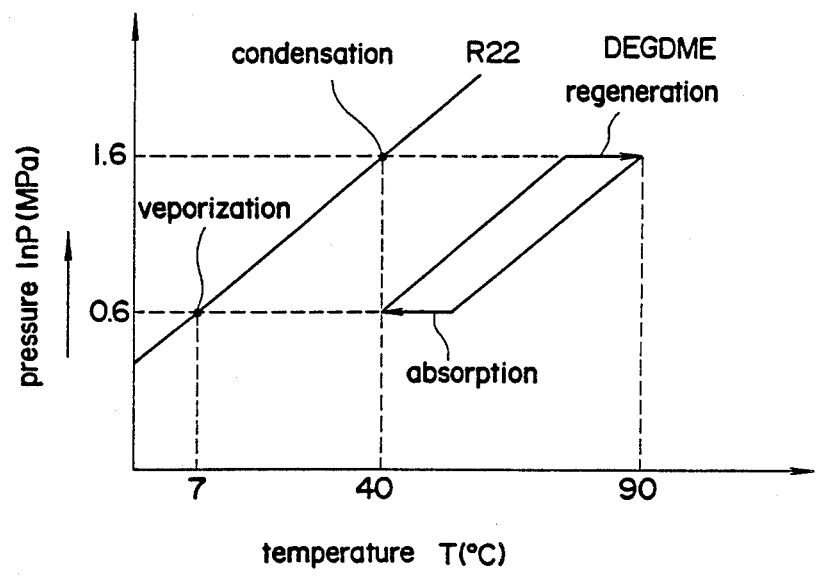
FIG. 2 is a cycle diagram of refrigerant and absorption liquid.

FIG. 2 shows examples of cycle curves (Dühring curves) for Freon 22 (R22) and diethylene glycol dimethyl ether (DEGDME). It is seen from these curves that the pressure difference of Freon 22 with respect to diethylene glycol dimethyl ether in a predetermined temperature range is 1 MPa, a high value.

A concrete example of the magnitude of the power to be recovered will now be described. The calculations are made on the conditions described with reference to Table 1 showing conventional examples.

The theoretical required power for transferring the diluted absorption liquid from the absorption unit 2 to the regeneration unit 3 is 0.36 kW/Rt; thus, if the pump efficiency is assumed to be 75%, then the required pump power is 0.36/.075=0.48 kW.

On the other hand, if it is assumed that the flow rate of the concentrated absorption liquid is 90% of that of the diluted absorption liquid and that the efficiency of the hydraulic turbine 11 is 70%, then the power recovered by the hydraulic turbine 11 is (0.36 kW/Rt)×0.9×0.7=0.23 kW.

Thus, as a result of the use of the hydraulic turbine 11, the power required of the electric motor 8 is 0.48−0.23=0.25 kW/Rt, a value which is about 52% of the power required to drive the pump 9. This means that the pump power has been saved by 48%.

In the case where the absorption type heat exchanger apparatus of the present invention is mounted on an automobile, the pump is driven by the engine of the automobile, and the engine jacket cooling heat, exhaust gas heat and the like are used as a heat source for the regeneration unit. Therefore, the pressures in the regeneration and evaporation units are dependent on the prevailing temperature conditions associated therewith. On the other hand, the rotation speed of the pump is dependent on that of the engine, while the delivery pressure of the pump is dependent on said conditions regardless of the rotation speed; therefore, the apparatus of the invention is more effective in the volumetric type in which the delivery pressure is determined without being influenced by the rotation speed.

In some cases, the pump and turbine can be installed close to each other or integrated together while replacing the two rotary shafts by a single shaft.

In the above embodiment, the invention has been applied to a first-kind absorption heat pump; it is equally applicable to a second-kind absorption heat pump. The second-kind absorption heat pump is a system which uses waste heat as a heat source for the evaporation and regeneration units representing endothermic process, intended to utilize the heat produced in the absorption unit which heats up to a higher temperature. In this case, since the pressure in the absorption unit is higher, the concentrated absorption liquid transfer pipe is provided with the pump and the diluted absorption liquid transfer pipe with the turbine.

What is claimed is:

1. An absorption type heat exchanging apparatus having an evaporation unit, an absorption unit, a regeneration unit and a condensation unit, comprising:

diluted absorption liquid transfer pipe means whereby a diluted liquid which as absorbed a refrigerant in the absorption unit is transferred to the regeneration unit, concentrated absorption liquid transfer pipe means whereby a concentrated absorption liquid having its refrigerant evaporated in the regeneration unit is transferred to the absorption unit, pump means placed in one of said diluted and concentrated absorption liquid transfer piep means and having a rotary shaft, a rotatively driving means for driving the pump means, power take-off means placed in the other of said diluted and concentrated liquid transfer pipe means, having a rotary shaft and adapted to receive rotative driving power from the absorption liquid flowing through said other pipe means, wherein the rotary shaft of said power take-off means being connected to the rotary shaft of said pump means.

2. An absorption type heat exchanging apparatus as set forth in claim 1, wherein the pump means and power take-off means are of the displacement type.

3. An absorption type heat exchanging apparatus as set forth in claim 2, wherein the power take-off means is a hydraulic turbine.

4. An absorption type heat exchanging apparatus as set forth in claim 1, wherein the refrigerant is a freon type refrigerant.

* * * * *